US006212009B1

(12) United States Patent
Alt-Nedvidek et al.

(10) Patent No.: US 6,212,009 B1
(45) Date of Patent: Apr. 3, 2001

(54) PHASE ANNULUS TO CARRY OUT A POSITIVE PHASE CONTRAST

(75) Inventors: Sabine Alt-Nedvidek, Steinhausen (CH); Claus Gunkel, Homberg (DE)

(73) Assignee: Leica Microsystems Wetzlar GmbH (DE)

( * ) Notice: Subject to any disclaimer, the term of this patent is extended or adjusted under 35 U.S.C. 154(b) by 0 days.

(21) Appl. No.: 09/308,855

(22) PCT Filed: Aug. 3, 1998

(86) PCT No.: PCT/DE98/02228

§ 371 Date: Nov. 12, 1999

§ 102(e) Date: Nov. 12, 1999

(87) PCT Pub. No.: WO99/17145

PCT Pub. Date: Apr. 8, 1999

(30) Foreign Application Priority Data

Sep. 29, 1997 (DE) ............................................... 197 43 027

(51) Int. Cl.[7] ............................ G02B 27/42; G02B 21/00
(52) U.S. Cl. ........................ 359/558; 359/370; 359/577; 359/585; 359/594; 428/5
(58) Field of Search .................................. 359/370, 387, 359/558, 559, 562, 576, 577, 585, 587, 885, 891, 894; 250/237 R; 430/5

(56) References Cited

U.S. PATENT DOCUMENTS

| 2,427,689 | * | 9/1947 | Osterberg et al. ..................... 359/370 |
| 2,616,334 | | 11/1952 | Zernike . |
| 5,144,362 | * | 9/1992 | Kamon et al. ......................... 355/53 |
| 5,461,516 | | 10/1995 | Kawano et al. ....................... 359/890 |

FOREIGN PATENT DOCUMENTS

| 0180745 | * | 1/1955 | (AT) ..................................... 359/370 |
| 0187704 | * | 11/1956 | (AT) . |
| 0045855 | * | 2/1966 | (DE) ..................................... 359/370 |
| 22 61 780 | | 1/1974 | (DE) . |
| 3412958A1 | * | 10/1985 | (DE) . |

OTHER PUBLICATIONS

Pluta, M.: "Stray–Light Problem in Phase Contrast Microscopy or Toward Highly Sensitive Phase Contrast Devices: A Review"; Optical Engineering, vol. 32, No. 12, Dec. 1, 1993, pp. 3199–3214.

* cited by examiner

*Primary Examiner*—Cassandra Spyrou
*Assistant Examiner*—John Juba, Jr.
(74) *Attorney, Agent, or Firm*—Simpson, Simpson & Snyder, L.L.P.

(57) ABSTRACT

The invention relates to a phase annulus consisting of a phase shifting thin-film system, which, in the case of a cemented system, has the following structure: (first) substrate-Ag-$n_H$-cement-(second) substrate, or a structure: (first) substrate-$n_1$-Ag-$n_2$-cement-(second) substrate. In the case of an uncemented structure, the thin-film system has the following structure: substrate-Ag-$n_H$-air, wherein $n_H$, $n_1$ or $n_2$ represent the respective refractive index of a dielectric film. Phase shifting of the positive phase contrast can be regulated in a targeted manner.

25 Claims, 10 Drawing Sheets

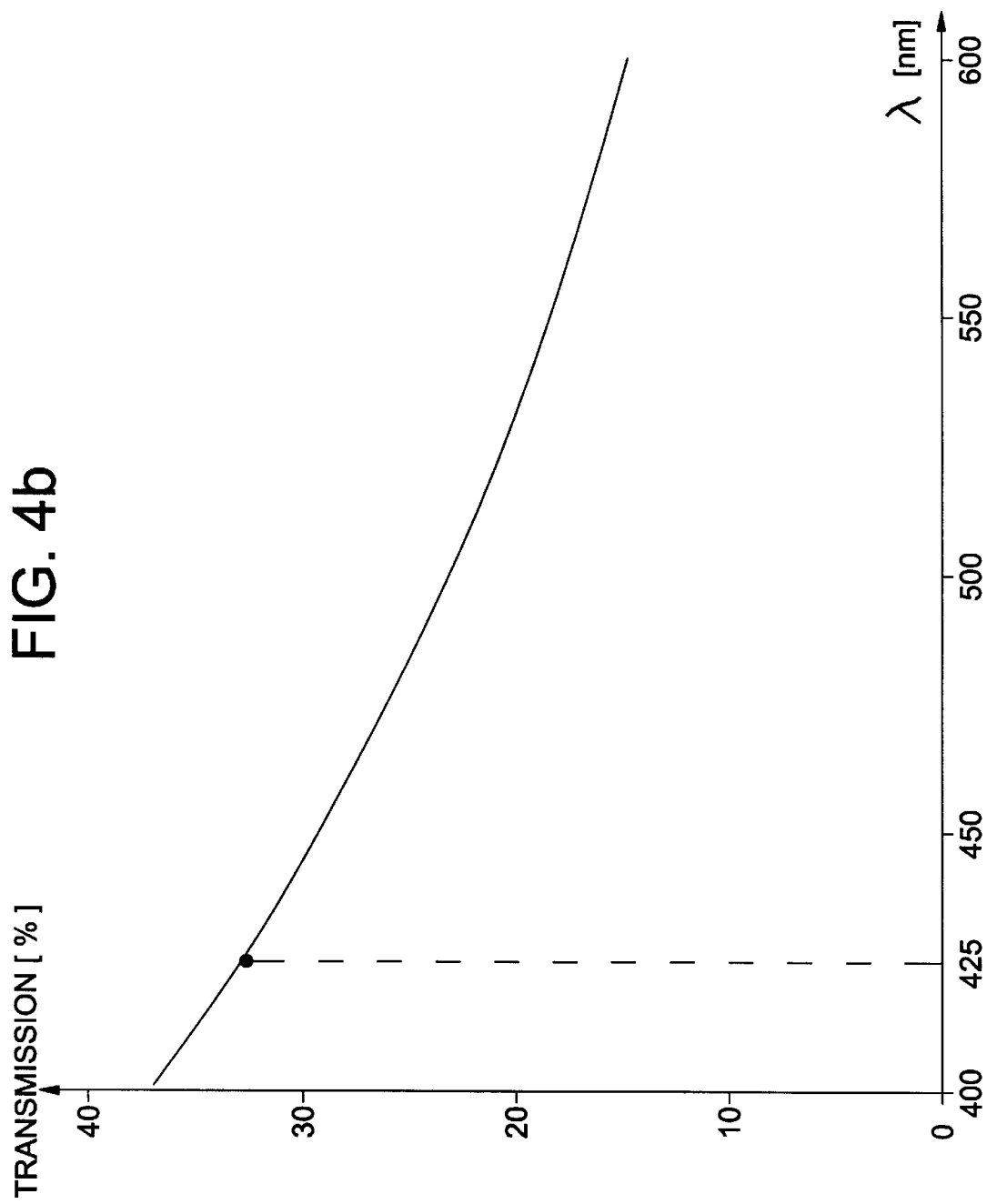

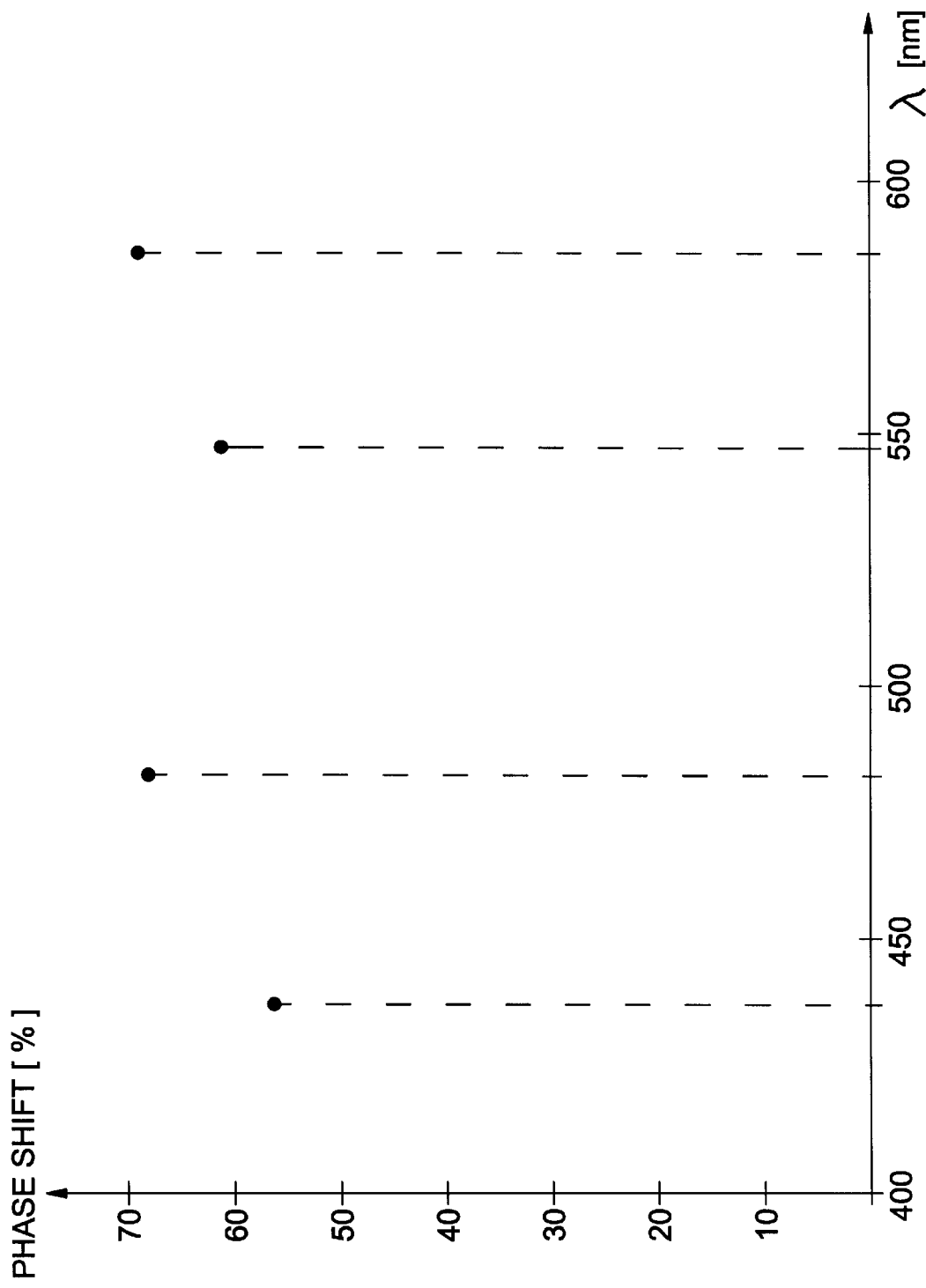

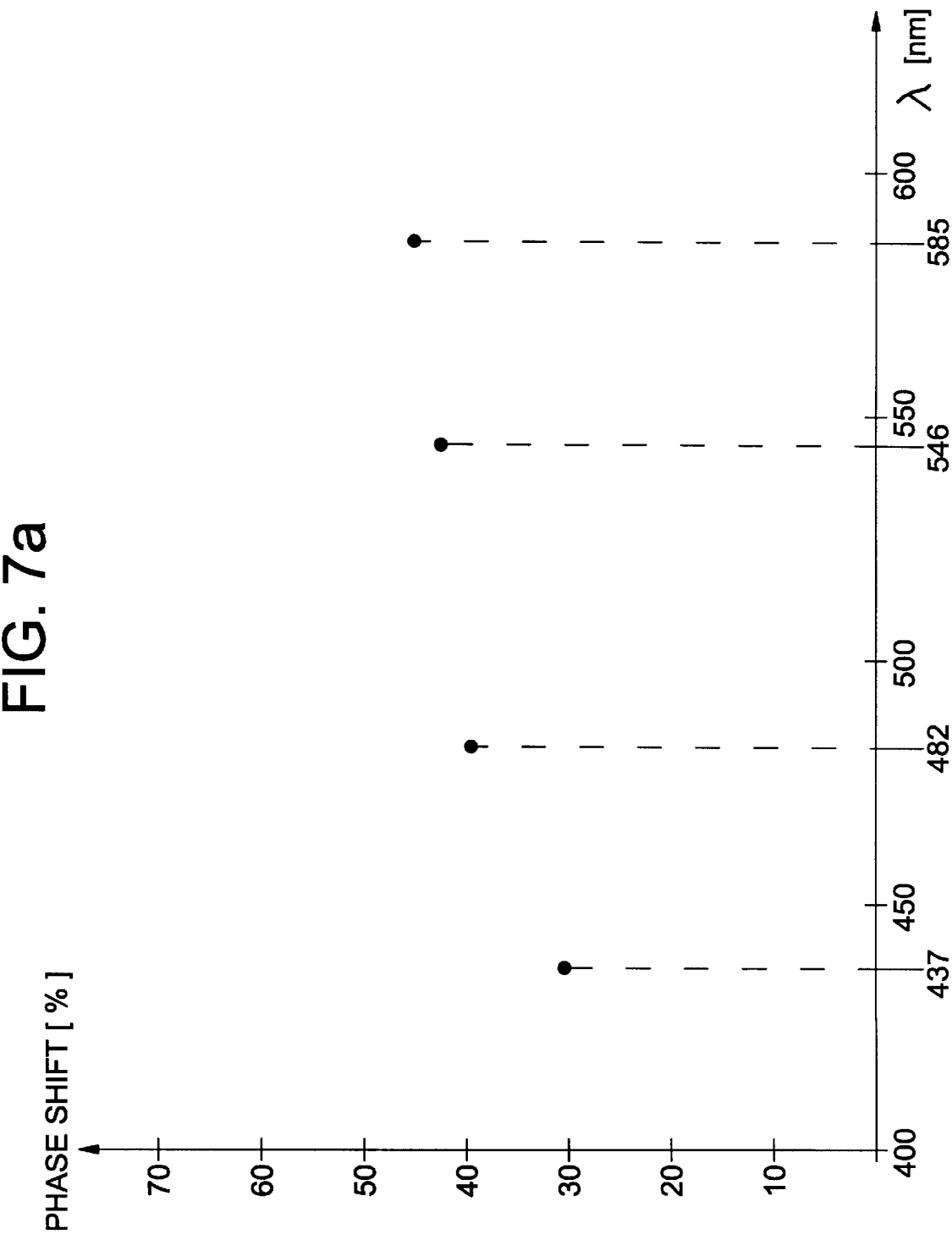

PHASE ANNULUS TO CARRY OUT A POSITIVE PHASE CONTRAST

BACKGROUND OF THE INVENTION

The invention concerns a phase annulus to produce positive phase contrast. Phase contrast microscopy has been known since Zernike. Accomplishment of this process requires production of "phase rings" by vapor-deposition of one or more thin layers on a substrate, which may be of optical glass, for instance. By skillful selection of the layer thickness, the phase of the direct light, which passes through the vapor-deposited phase, can be delayed relative to the phase of the diffracted light, which is the light that does not pass through the phase annulus, by, for instance, $\pi/2$; or it can be advanced by $\pi/2$. That latter case is "positive" phase contrast.

BRIEF SUMMARY OF THE INVENTION

The objective of this invention is to make available a phase annulus with which one can produce positive phase contrast with essentially constant phase shift and a discrete transmission curve. Another part of the object is to establish each positive phase shift firmly within a certain phase angle interval.

BRIEF DESCRIPTION OF THE DRAWINGS

The objective is attained according to the invention through the features of three example embodiments. Other advantageous embodiments appear from the specification. See the following figures for a more detailed explanation. They show:

FIG. 1b: A reduced plan view of what is shown in FIG. 1a.

FIG. 4a: A graph of the phase shift of a cemented phase annulus according to FIG. 1a.

FIG. 4b: A graph of the transmission versus the wavelength $\lambda$ for a cemented phase annulus having a silver layer 35 nm thick.

FIG. 6a: A graph of the phase shift versus the wavelength $\lambda$ for a cement for which $n_{Cement} > n_1$.

FIG. 6b: A graph of the transmission versus the wavelength $\lambda$ for a thin-layer system according to FIG. 6a.

FIG. 7a: A graph of the phase shift versus the wavelength $\lambda$ for a cement for which $n_{Cement} < n_1$.

FIG. 7b: A graph of the transmission T versus the wavelength $\lambda$ for the thin-layer system already mentioned in FIG. 7a.

DETAILED DESCRIPTION OF THE PREFERRED EMBODIMENTS

Figure 1A:
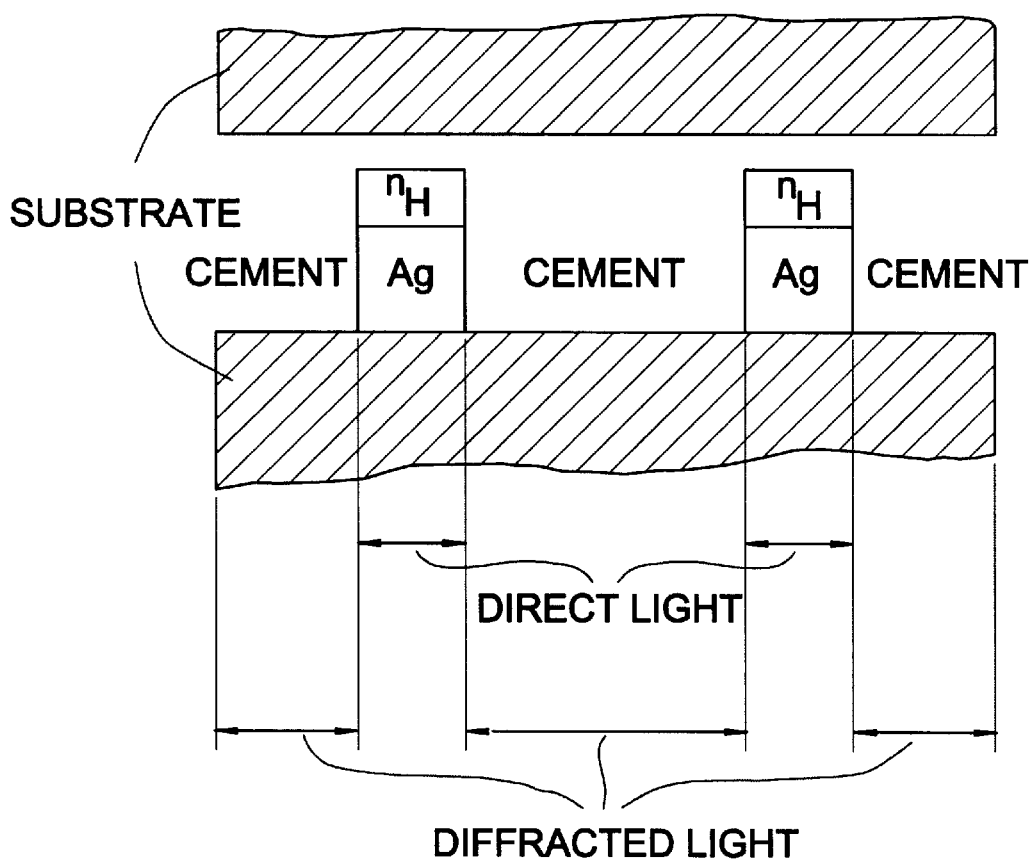
FIG. 1a: A schematic representation of a cemented phase annulus according to a first embodiment.

FIG. 1a shows schematically a cemented phase annulus according to the invention. A ring of silver (Ag) is vapor-deposited onto a substrate, for instance, a glass plate or a glass lens, and a dielectric layer with the refractive index $n_H$ is deposited on that. Inside the phase annulus so produced, and on the entire substrate outside this phase annulus is the cement matrix, which produces a solid body bond to the second substrate. It is part of the principle of the phase contrast process that direct light, which in FIG. 1a is incident from below on the substrate carrying the phase annulus, passes through the phase annulus and in so doing experiences a definite phase shift, while diffracted light passes through all the other regions of the substrate not covered by the vapor-deposited phase annulus.

Figure 1B:
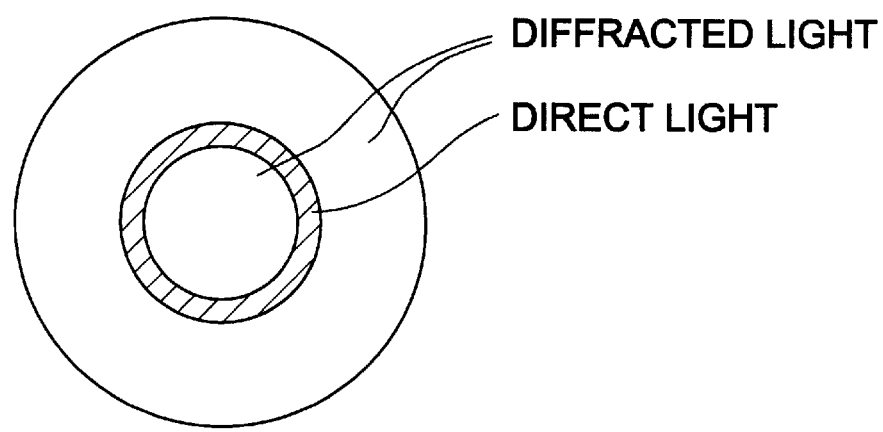
Figure 2:
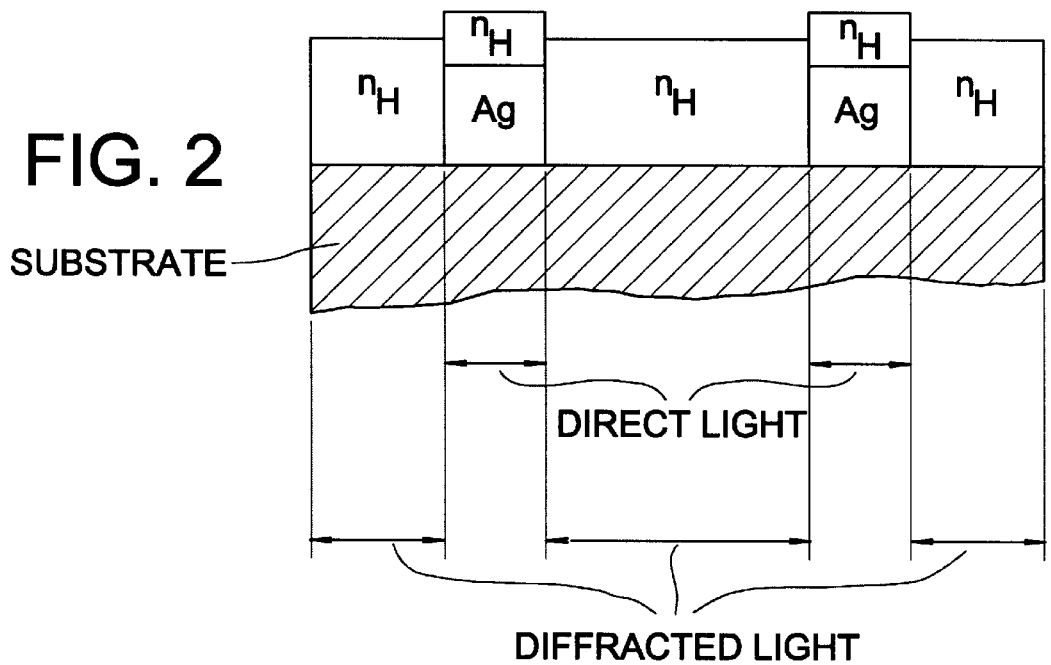
FIG. 2: A schematic representation of the layer structure in the case of an uncemented thin-layer system according to a second embodiment.

FIG. 1b shows a reduced plan view of what is shown in FIG. 1a, once more showing the two regions (direct light/diffracted light). FIG. 2 shows an uncemented embodiment. The plan view is similar to that of FIG. 1b. An optical glass or other transparent medium, e. g., crystal or plastic, is used as the substrate material. The layer system has layers of silver and a dielectric material, such as a titanium-oxygen compound, vapor-deposited in vacuum. Furthermore, it is also possible to provide the layer system with a layer that reduces reflection. Application of these structures is known, for example, from German Patent 2 261 780. A Menzel three-slit interferometer is used to measure the actual phase shift.

Figure 3:
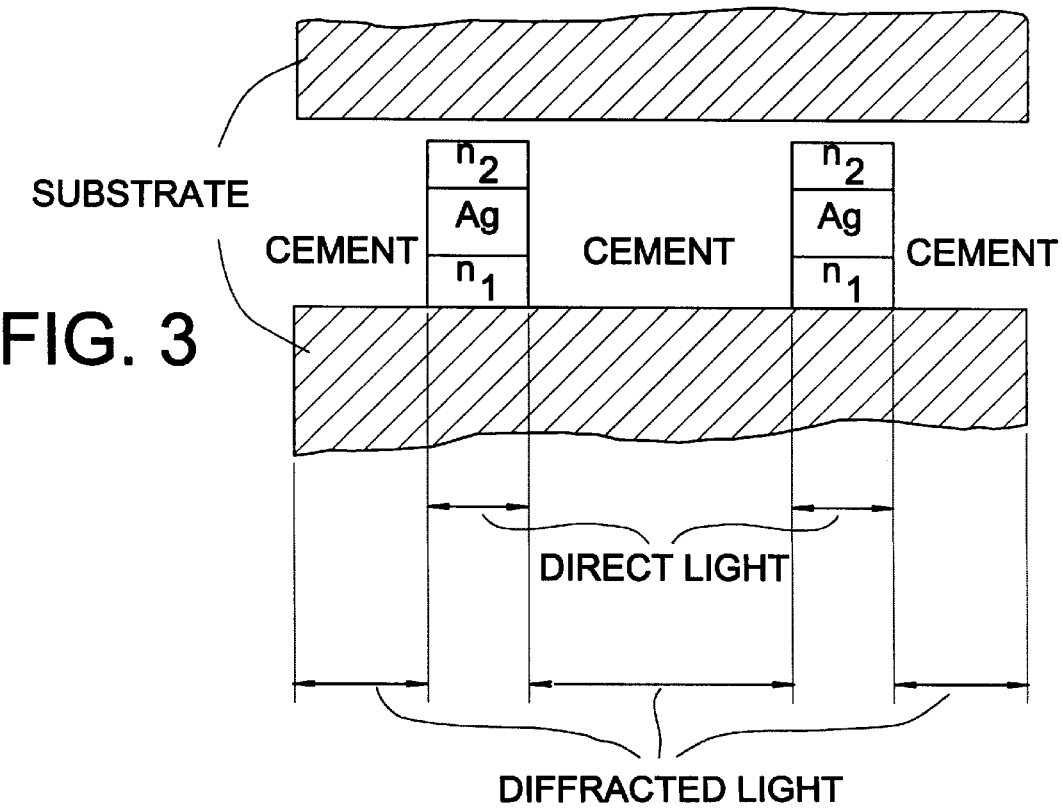
FIG. 3: A schematic representation of the layer structure of a cemented phase annulus according to a third embodiment.

FIG. 3 is another embodiment of a cemented thin-layer system. One can see that a layer with the refractive index $n_1$ is first coated on the lower (first) substrate, followed by the actual silver layer and then by a layer with refractive index $n_2$. A plan view would again, purely schematically, be that shown in FIG. 1b.

Figure 4A:
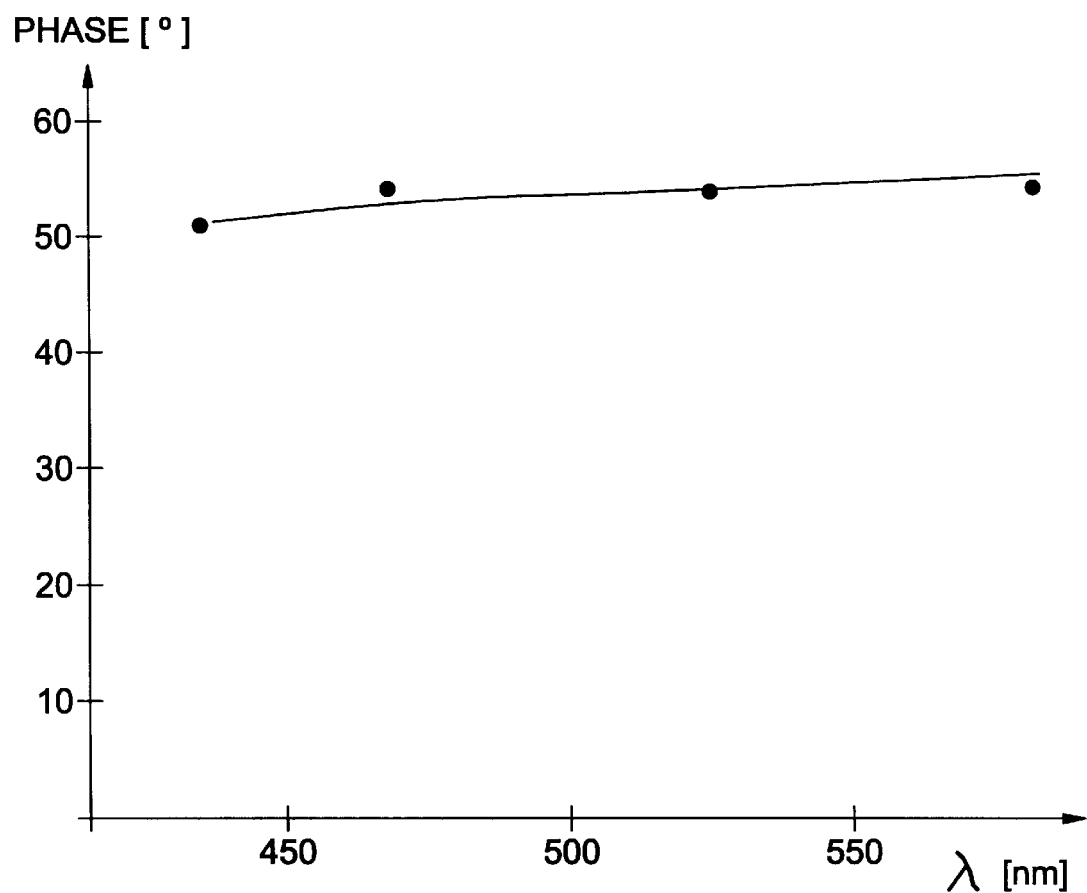

FIG. 4a shows a graph of the phase shift of a cemented phase annulus versus the wavelength $\lambda$. One can see that the four measurements in the range between 425 nm and 600 nm are between 50° and 55°. The transmissions found for this example (the thickness of the silver layer in this case, $d_{Ag}$, is 35 nm) are shown in FIG. 4b. As can be seen, the transmission is 38% for a $\lambda$ of 425 nm and 15% for a $\lambda$ of 600 nm. This is a thin-layer system with the layer sequence:

Glass-$n_1$-Ag-$n_2$-Cement-Glass.

The transmission of the entire system is determined by the thickness of the silver layer. That is linked with a phase shift. The layer with refractive index $n_2$ [sic] primarily protects the silver. It comprises, for example, an oxide ($Al_2O_3$) of suitable thickness, e. g., 5 nm. The desired phase shift $\varphi$ is established primarily with the $n_1$ layer. The relations $$\frac{\varphi}{360°} = \frac{\Delta s}{\lambda}$$

and $$\Delta s = (n_{Cement} - n_1) \cdot d_1$$

apply.

Surprisingly, it has now turned out, according to the invention, that if a cement is used for which $$n_{Cement} > n_1$$

for instance, with cements having $n_{Cement} = 1.56$ to $1.59$, with $n_1 = 1.38$, the resulting phase shift increases with increasing thickness $d_1$ of the $n_1$ layer.

Figure 5A:
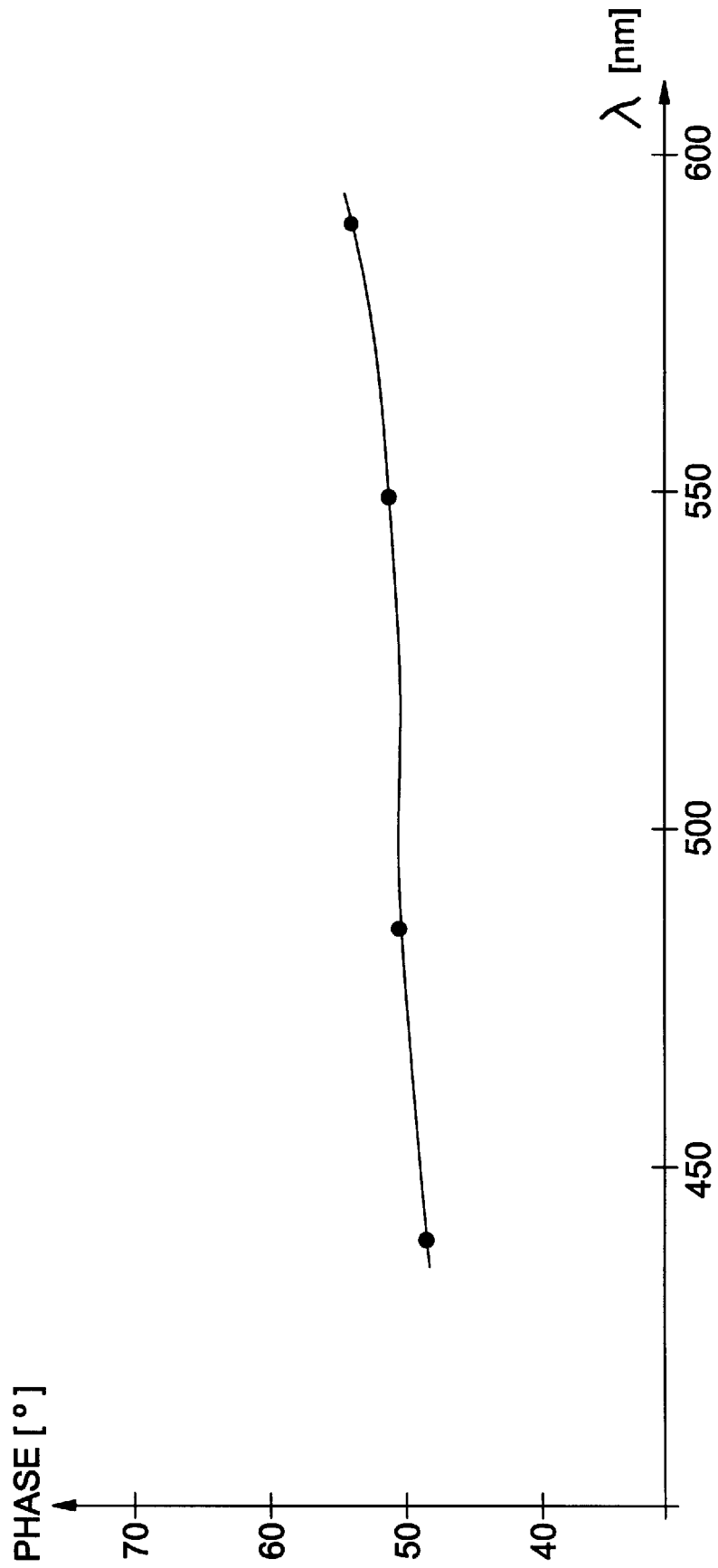
FIG. 5a: A graph of the phase shift versus the wavelength $\lambda$ for an uncemented phase annulus.
Figure 5B:
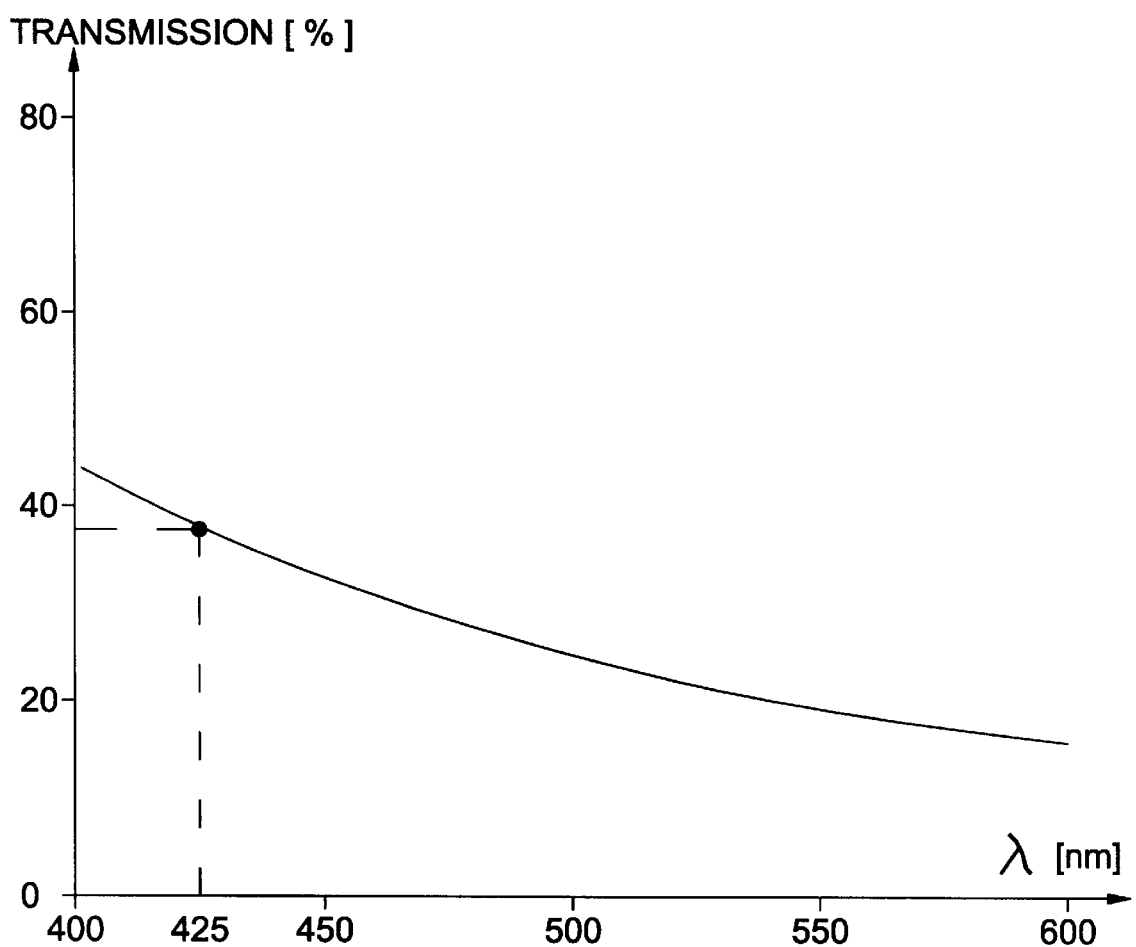
FIG. 5b: A graph of the transmission versus the wavelength $\lambda$ for an uncemented phase annulus with a silver layer thickness of 34.5 nm.

FIG. 5a shows graphically how the phase shift depends on the wavelength $\lambda$ for an uncemented phase annulus as that in FIG. 2. The phase shift is between 49° and 55° in the wavelength range from 425 nm to 600 mn. Similarly, FIG. 5b shows the transmission of this uncemented phase annulus versus the wavelength λ for a silver layer with thickness $d_{Ag}$=34.5 nm.

Figure 6B:
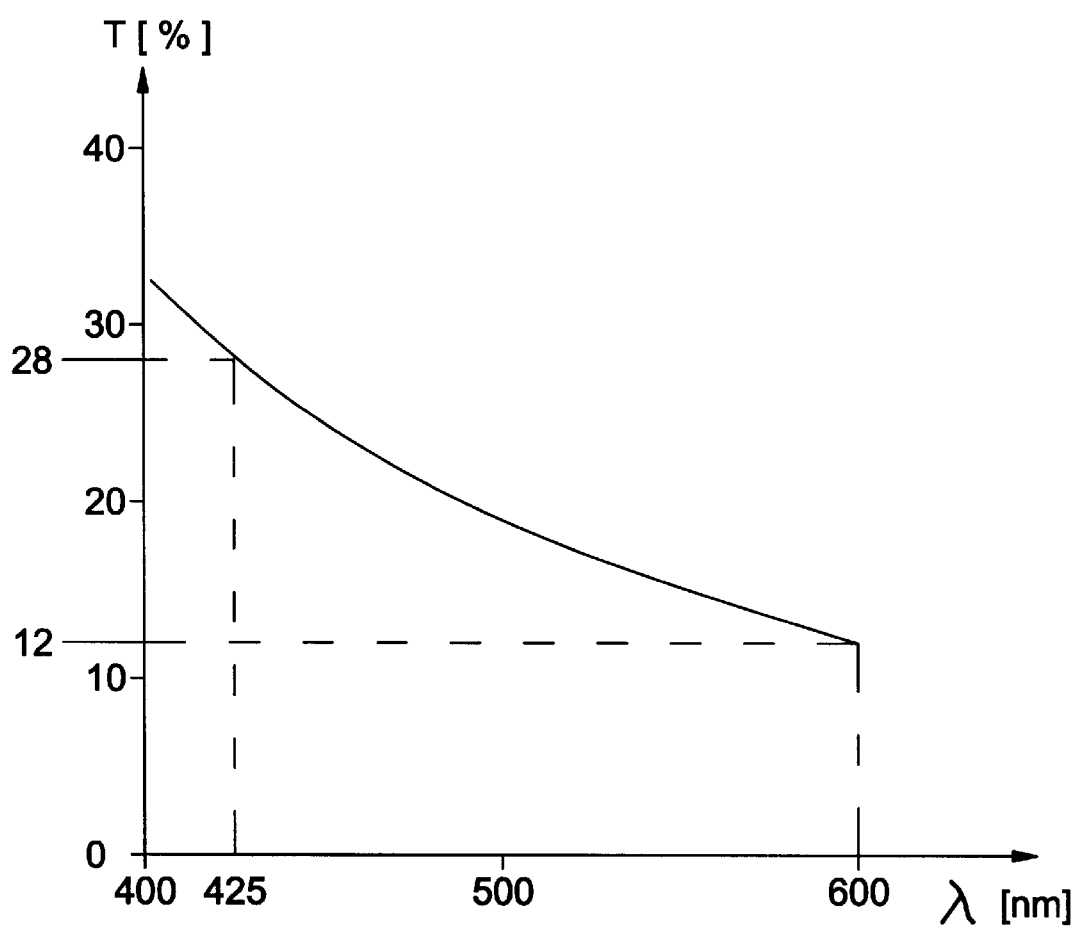

FIG. 6a shows a graph of the phase shift versus the wavelength for a cement having a refractive index $n_{Cement}>n_1$. As can be seen, the phase shift is 59° at a wavelength of 437 nm, 71° at 482 nm, 64° at 546 nm, and 72° at 585 nm. Similarly, FIG. 6b shows the transmission T versus the wavelength λ. The transmission is 28% at a wavelength of 425 nm and about 12% at 600 nm.

Figure 7B:
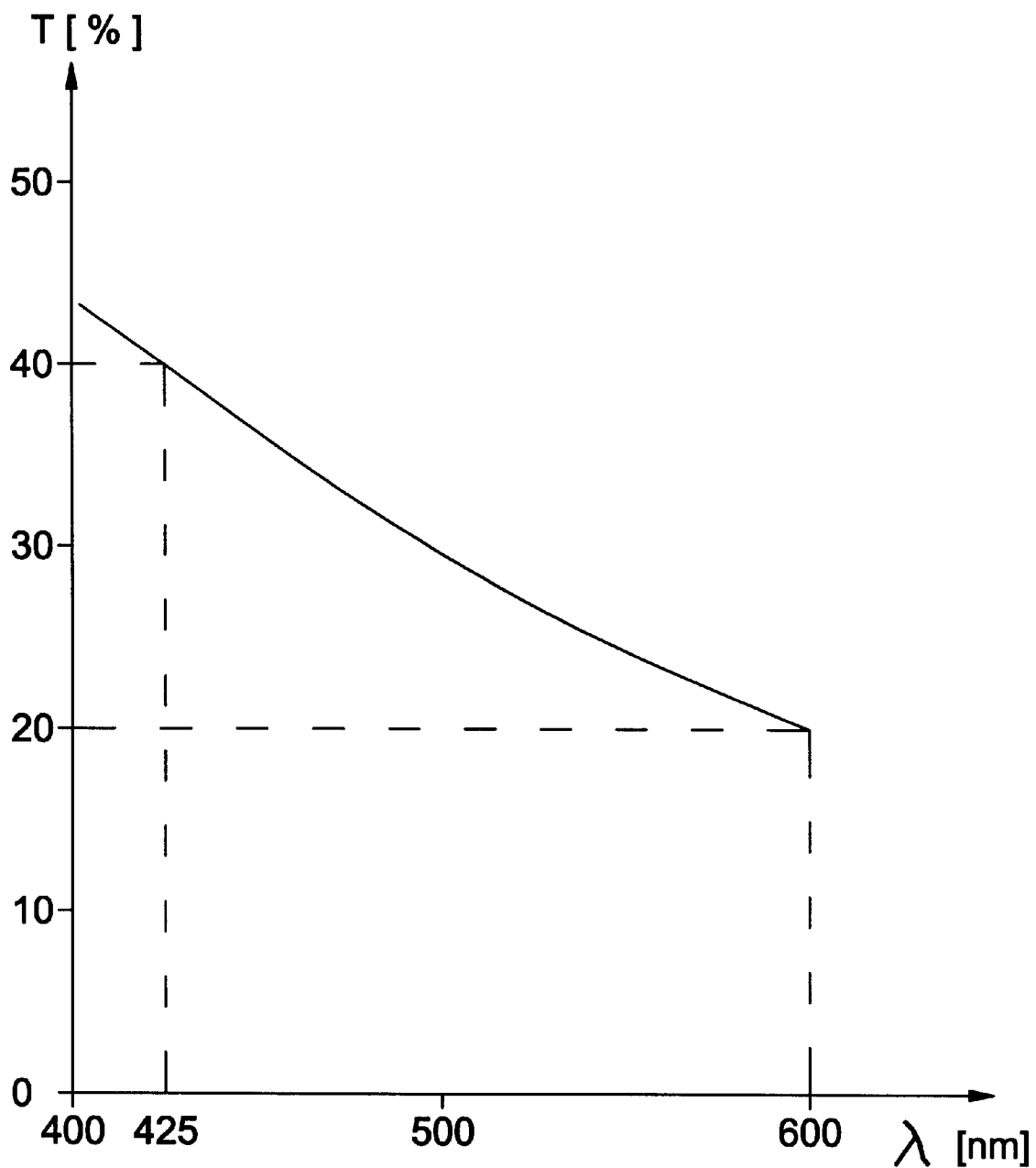

FIG. 7a shows the phase shift versus the wavelength λ for a cement with a refractive index $n_{Cement}<n_1$. The phase shift is 30° at a wavelength of 437 nm, 40° at 482 nm, 42° at 546 nm, and 46° at 585 nm. FIG. 7b, correspondingly, shows the transmission T versus the wavelength λ. The transmission is 40% at 425 nm and 20% at 600 nm.

With this invention, therefore, it becomes possible to attain positive phase contrast with an essentially constant phase shift of 50° to 55° in the wavelength range from 425 nm to 600 nm. At the same time a transmission, T, of about 35% (at 425 nm) to 15–20% (at 600 nm) is attained. That applies for both cemented and uncemented systems. Furthermore, this invention allows establishing any positive phase shift between 40° and 60°.

What is claimed is:

1. A phase annulus for producing a positive phase shift comprising a cemented phase-shifting thin-layer system including first and second substrates, a silver layer applied directly to said first substrate, a layer having a refractive index $n_H$ applied directly to said silver layer, and a transparent cement filling intermediate space between said first and second substrates such that a transparent cement matrix remains between said layer having a refractive index $n_H$ and said second substrate.

2. The phase annulus according to claim 1, wherein said first and second substrates comprise transparent media.

3. The phase annulus according to claim 2, wherein said transparent media are chosen from the group consisting of optical glass, plastic, and crystal.

4. The phase annulus according to claim 1, wherein said layer having a refractive index $n_H$ comprises a dielectric material.

5. The phase annulus according to claim 4, wherein said dielectric material is a titanium-oxygen compound.

6. The phase annulus according to claim 1, wherein said thin-layer system further includes a reflection-reducing coating.

7. The phase annulus according to claim 1, wherein the phase shift produced can be established deliberately.

8. A phase annulus for producing a positive phase shift comprising a cemented phase-shifting thin-layer system including a substrate, a silver layer applied directly to said substrate, a layer having a refractive index $n_H$ applied directly to said silver layer, and another layer having a refractive index $n_H$ applied directly to surface areas of said substrate on which no silver layer is applied, wherein said another layer has a thickness greater than a thickness of said silver layer and less than a combined thickness of said silver layer and said layer applied directly to said silver layer.

9. The phase annulus according to claim 8, wherein said substrate comprises a transparent medium.

10. The phase annulus according to claim 9, wherein said transparent medium is chosen from the group consisting of optical glass, plastic, and crystal.

11. The phase annulus according to claim 8, wherein said layers having a refractive index $n_H$ comprise a dielectric material.

12. The phase annulus according to claim 11, wherein said dielectric material is a titanium-oxygen compound.

13. The phase annulus according to claim 8, wherein said thin-layer system further includes a reflection-reducing coating.

14. The phase annulus according to claim 8, wherein the phase shift produced can be established deliberately.

15. A phase annulus for producing a positive phase shift comprising a phase-shifting thin-layer system including first and second substrates, a layer having a refractive index $n_1$ applied to said first substrate for producing a phase shift φ, a silver layer applied to said layer having a refractive index $n_1$, a layer having a refractive index $n_2$ applied to said silver layer for protecting said silver layer, and a transparent cement filling intermediate space between said first and second substrates such that a transparent cement matrix remains between said layer having a refractive index $n_2$ and said second substrate.

16. The phase annulus according to claim 15, wherein said first and second substrates comprise transparent media.

17. The phase annulus according to claim 16, wherein said transparent media are chosen from the group consisting of optical glass, plastic, and crystal.

18. The phase annulus according to claim 15, wherein said layer having a refractive index $n_1$ comprises a dielectric material.

19. The phase annulus according to claim 18, wherein said dielectric material is a titanium-oxygen compound.

20. The phase annulus according to claim 15, wherein said layer having a refractive index $n_2$ comprises a dielectric material.

21. The phase annulus according to claim 20, wherein said dielectric material is a titanium-oxygen compound.

22. The phase annulus according to claim 15, wherein said thin-layer system further includes a reflection-reducing coating.

23. The phase annulus according to claim 15, wherein the phase shift produced can be established deliberately.

24. The phase annulus according to claim 15, wherein said cement has a refractive index $n_{Cement}$ in a range from 1.56 to 1.59 and $n_{Cement}$ is greater than $n_1$, whereby said positive phase shift increases with increasing thickness of said layer having refractive index $n_1$ relative to a phase shift produced by a partial system consisting of said silver layer and said layer having refractive index $n_2$.

25. The phase annulus according to claim 15, wherein said cement has a refractive index $n_{Cement}$ in a range from 1.56 to 1.59 and $n_{Cement}$ is less than $n_1$, whereby said positive phase shift decreases with increasing thickness of said layer having refractive index $n_1$ relative to a phase shift produced by a partial system consisting of said silver layer and said layer having refractive index $n_2$.

* * * * *